May 20, 1930.    R. H. DEPEW, JR    1,759,442
CONTROL SURFACE OPERATING MECHANISM
Filed April 2, 1928

Inventor
RICHARD H. DEPEW, JR.
By his Attorney
B H Carpenter

Patented May 20, 1930

1,759,442

UNITED STATES PATENT OFFICE

RICHARD HENRY DEPEW, JR., OF FOREST HILLS, NEW YORK, ASSIGNOR TO FAIRCHILD AIRPLANE MANUFACTURING CORPORATION, OF NEW YORK, N. Y.

CONTROL-SURFACE-OPERATING MECHANISM

Application filed April 2, 1928. Serial No. 266,831.

This invention relates to aircraft in general, and, in particular to aeroplanes provided with wings adapted to be folded backwardly along the fuselage when the aeroplane is being prepared for storage, shipment or transportation such as the Fairchild cabin monoplane, but I do not desire to limit myself in this respect since this invention is equally applicable to folding wing aeroplanes in general.

In general, this invention has for its objects to provide a means for folding the wings of an aeroplane without it being necessary to disconnect the aileron controlling means.

Another object of this invention is to provide a means for causing the ailerons to fold up automatically whenever the wings are folded so that the folding of the wings is not interfered with by the striking of the ailerons against the sides of the fuselage or each other or the empennage.

Still another object of this invention is to provide means for elevating or depressing both ailerons simultaneously in order to vary their normal relation to the wings.

It has been found desirable in aeroplane construction to build the wings of the aeroplane in such a manner as to permit folding of the wings backward along the fuselage in order to facilitate storage, shipment, or transportation of the aeroplane. Hitherto it has been prevalent to disconnect the aileron controlling mechanism from the ailerons before the wings could be folded.

Other objects and advantages of the present invention will be apparent from the following specification, claims and appended drawings, in which:—

Figure 1:
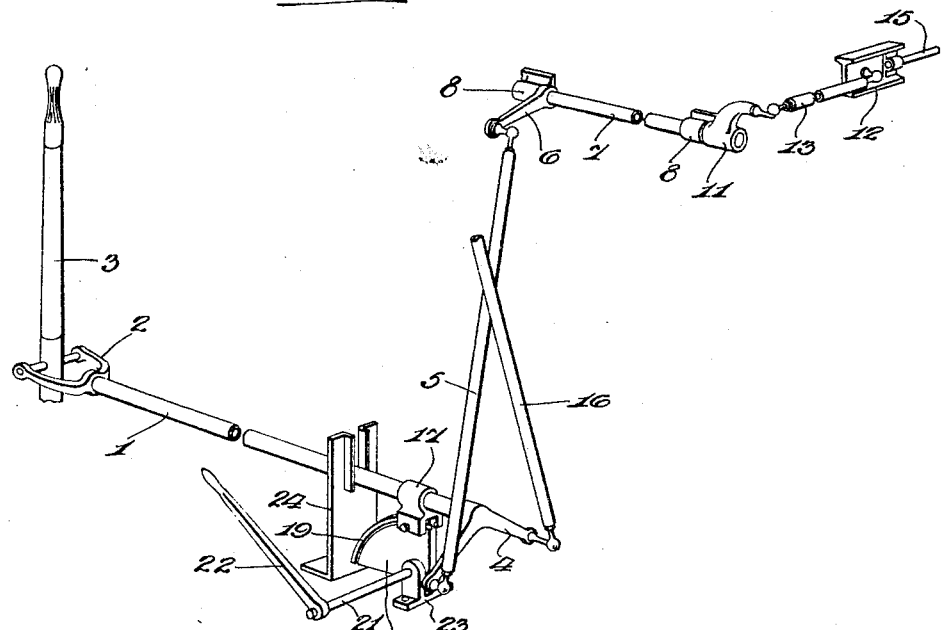
Fig. 1 is a perspective view showing the mechanism for connecting the control lever with the right aileron of the aeroplane and the mechanism for adjusting the aileron simultaneously and independently of the control lever.

In the drawings I have illustrated one embodiment of my invention in which the numeral 1, Fig. 1, represents a shaft which extends longitudinally within the fuselage of the aeroplane and which lies just below the pilot's seat. The shaft 1 is supported by suitable bearings and is provided at its forward end with a forked piece 2 formed integral with the shaft or secured thereto in any suitable manner. A suitable control lever 3 is provided which is pivoted between the arms of the forked piece 2 and extends upwardly in front of the pilot's seat.

The control lever 3 is commonly termed the "joy-stick" in the aeroplane art and is provided for the purpose of controlling the position of the horizontal rudder carried by the tail of the aeroplane and the positions of the ailerons which are usually mounted on the wings. The connections of the control lever to the horizontal rudder form no part of the present invention and need not be shown or described.

The shaft 1 is provided with a bell crank 4 which lies below and between the junction points of wings and fuselage. A rod 5 is connected by means of a suitable joint to one of the arms of the bell crank 4 and is also connected to an arm 6 secured to a shaft 7. The shaft 7 is supported by suitable bearings 8 which are mounted just within the upper right hand part of the fuselage and adjacent to the hinge joint 10$^a$ of the wing. The hinge joint 10$^a$ serves to pivotally connect the right wing 10 to the aeroplane fuselage and is provided for the purpose of permitting the folding of the wing backwardly along the aeroplane fuselage.

Figure 2:
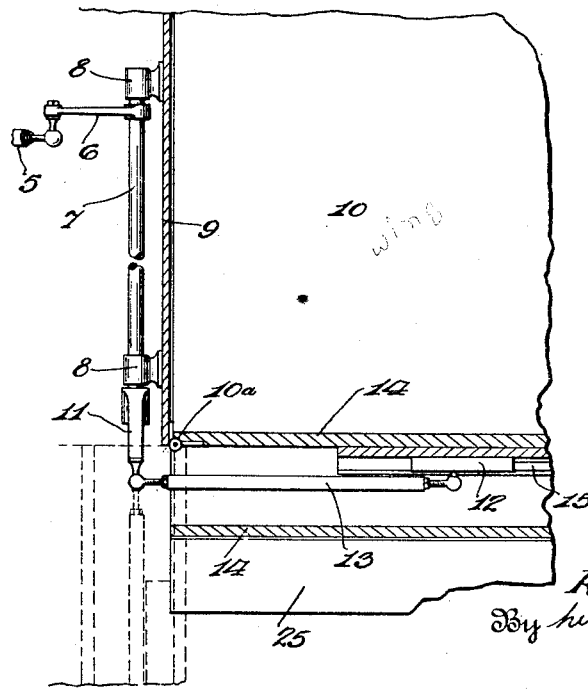
Fig. 2 is a plan view, partly in section, showing part of the fuselage and the manner in which the aileron controlling mechanism is mounted within the right wing.
Figure 3:
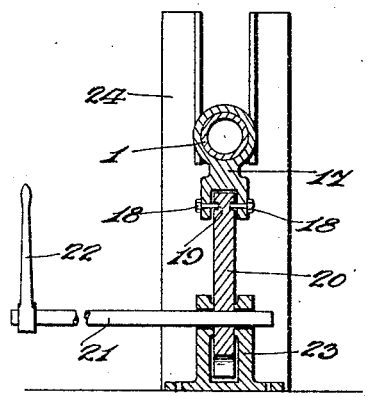
Fig. 3 is a vertical section illustrating the mechanism for adjusting the ailerons independently of the control lever.

The operating mechanism between the shaft 7 and the aileron includes an arm 11 fast to shaft 7 and connected to a cross-head 12 by means of a connecting rod 13. The crosshead 12 is adapted to slide on suitable guides mounted within the right wing 10 between the members 14 which form part of the internal structure of the wings. It is desirable but not necessary that the connection between the rod 13 and the cross-head 12 be in the prolongation of the axis of the shaft 7 when the wing is in folded position. This arrangement allows the movement of the controlling mechanism carried by the body without movement of the ailerons when the wings are in folded position. A rod 15 connected to the cross-head 12 connects the said cross-head to the mechanism for operating the aileron. The mechanism thru which the rod 15 operates the aileron forms no part of the present invention and is not shown or described. It will be sufficient for present purposes to explain that when the rod 15 is moved to the right as viewed in Fig. 2 the right aileron will be elevated, and similarly if the rod 15 is moved to the left the same aileron will be depressed.

The mechanism so far described is for the purpose of controlling the elevation or depression of the right aileron. In order to control the aileron mounted on the left wing a mechanism similar in construction is provided and is operated by means of a rod 16 pivoted to the other arm of the bell-crank 4.

It will be observed that when the rod 5 is raised by the rocking of the shaft 1 the rod 16 will be depressed. The effect of this construction is to cause the rods 15 associated with both wings to move in unison so that one aileron will be depressed when the other aileron is elevated. When the control lever 3 is in the neutral or upright position both ailerons are in normal position with respect to the wings of the aeroplane. A slight movement of the control lever 3 to rock the shaft 1 in either direction will cause the depression of one of the ailerons and the elevation of the other. The angular amount of movement of both ailerons will not be the same however, owing to the downward slope of the arms of the bell-crank 4. This produces a differential action in which the upward movement of the one aileron from normal is greater than the downward movement of the other aileron. If desired the differential feature may be omitted by suitably designing the bell-crank 4.

The mechanism just described is adapted to control the position of the ailerons while the aeroplane is in flight so that the machine may be banked properly and controlled at all times. It has been found desirable to provide means for adjusting both ailerons simultaneously in the same direction and for that purpose the following mechanism has been provided:

The rear end of shaft 1 is supported in a movable bearing 17 which is provided with two screws 18 projecting into cam slots in a cam 20. The cam 20 is secured to a shaft 21 and may be turned about the shaft as an axis by means of an adjusting lever 22 fastened to the shaft. The shaft 21 lies just in the rear of and below the pilot's seat and the handle of the adjusting lever 22 projects within easy reach of the pilot at all times. Suitable bearings 23 mounted on the fuselage support the shaft 21 while a vertically projecting plate 24 provided with a vertical slot permits the shaft 1 to be raised or lowered under the influence of the cam but prevents any actual movement of the shaft toward either side of the fuselage.

It will be apparent that the shifting of the lever 22 will rotate the cam 20 about shaft 21 as an axis causing the bearings 17 to move vertically in either direction, depending, of course, upon the direction of movement of the lever 22. When the control lever 3 is in its neutral position with both ailerons in normal position, the shifting of the bearing 17 vertically upward or downward will cause both ailerons to be elevated or depressed simultaneously since both of the rods 5 and 16 will be moved upwardly or downwardly together.

During the process of folding the wings, the control lever 3 remains in the neutral position and each wing is gradually folded backwards along the side of the fuselage, turning about the hinge joint 10$^a$ as a pivot. The pivot point of the rod 13 and bell crank 11 of each wing remains fixed relative to the fuselage during the folding operation, and, since the hinge joint 10$^a$ is to one side of the pivot, the rods 13 and 15 of each wing will be held from movement in the direction of their axes. As a result the rod 15 of the wing being folded will be forced further into the wing than is usual in ordinary control movements. This additional movement of the rod 15 causes a gradual elevation of the aileron to which the rod is connected as the wing is being folded, so that the aileron will be nearly vertical to the wing when the wing is in folded position thus preventing any interference between the aileron and the side of the fuselage or between the aileron and the empennage or between the ailerons of the two wings. This construction allows the wings to be folded as compactly as possible and at the same time make it unnecessary to disconnect the ailerons from the control mechanism. It is obvious that when the wings are again moved into position ready for flying that the parts of the mechanism will be restored to their former position.

It is obvious that the aileron operating linkage may if desired be so arranged that movement of the rod 15 outward in the wing will depress the aileron. With such an arrangement the folding of the wing will of course, cause the aileron to be depressed, the extent of depressing depending on the construction and arrangment of the parts and particularly the relation between wing pivot 10$^a$ and the pivot on the arm 11.

Various changes in the construction of the embodiment illustrated in the drawings may be made without departing from the spirit of the invention, and I do not therefore, desire to limit myself to the specific construction shown and described but to interpret the invention broadly within the scope of the appended claims.

What I claim as my invention is:

1. In an airplane of the folding wing type, ailerons mounted on the airplane wings, aileron controlling means mounted in the airplane body, said controlling means being operably connected to said ailerons when said wings are in normal position and inoperatively connected with said ailerons when said wings are in folded position, to permit the operation of said controlling means without a resulting movement of said ailerons when said wings are in folded position.

2. In an airplane having a wing pivotally connected to a body, an aileron mounted on said wing, controlling means for said aileron mounted on said body, and operating connections between said controlling means and said aileron including a member on said body pivotally connected to a member on said wing at a point to the rear and toward the center line of said body from the pivot point of said wing for automatically moving the aileron connecting member into the wing upon folding action of the wing.

3. In an airplane, a body, a wing pivotally connected to said body for folding along said body, an aileron mounted on said wing, an aileron operating member carried by said body, an aileron operating member carried by said wing and connected to the aileron operating member carried by said body at a point nearer the center line of said body than the pivotal connection of said wing.

4. In an airplane having folding wings connected to a body, ailerons mounted on said wings, manual control means for said ailerons mounted on said body and including cam means for simultaneously moving said ailerons in the same direction, said ailerons also being automatically operable simultaneously to elevated positions by said wings.

5. In an airplane, a body, a wing pivotally connected to said body, an aileron mounted on said wing, a rotatable aileron operating member carried by said body, an aileron operating member carried by said wing and operatively connected to said rotatable member and mounted on said wing at a point in the prolongation of the axis of said rotatable member when the wing is in folded position.

6. In an airplane, a body, a wing, an aileron mounted on said wing, a controlling mechanism for said aileron including a crosshead mounted on said wing for sliding movement, operating connections between said cross-head and said aileron, an operating member carried by said body, a connecting rod at one end to said cross-head and at the other to said operating member.

7. In an airplane, a body, a wing, an aileron mounted on said wing, a controlling mechanism for said aileron including a crosshead mounted on said wing for sliding movement, operating connections between said cross-head and said aileron, an operating member carried by said body, a connecting rod connected at one end to said cross-head and at the other to said operating member, a manually operable member, and operating connections between said manually operable member and said operating member.

8. In an airplane of the folding wing type, ailerons mounted on the airplane wings, aileron controlling means mounted in the airplane body, having members for operatively connecting said controlling means with said ailerons when said wings are in normal position and for inoperatively connecting same when said wings are in folded position, said connecting members being automatically operable by said wings, to permit the operation of said controlling means without a resulting movement of said ailerons when said wings are in folded position.

9. In an airplane of the folding wing type, ailerons mounted on the airplane wings, aileron controlling means mounted in the body of said airplane, aileron actuating means attached to said wings, operating connections between said aileron controlling means, said operating means being automatically operable by said wings for simultaneously moving said ailerons in the same directions and to render the same elevated and inoperable when said wings are in folded position.

10. In an airplane of the folding wing type, ailerons mounted on the airplane wings, rotary aileron controlling means, reciprocal aileron actuating means attached to said wings and operative members therebetween rigidly connected to said actuating means and pivotally connected to said controlling means, to permit the operation of said controlling means without a resulting movement of said ailerons when said wings are in folded position.

11. In an airplane of the folding wing type, ailerons mounted on the airplane wings, rotary aileron controlling means, reciprocal aileron actuating means attached to said wings and operative members therebetween rigidly connected to said actuating means and pivotally connected to said controlling means, said controlling means being manually operable, and said actuating means and said operative connecting members being automatically operable by said wings, to permit the operation of said controlling means without a resulting movement of said ailerons when said wings are in folded position.

In testimony whereof I affix my signature.

RICHARD HENRY DEPEW, Jr.